United States Patent [19]

Kuwahara

[11] Patent Number: 5,270,834
[45] Date of Patent: Dec. 14, 1993

[54] FACSIMILE APPARATUS WITH MESSAGE-BOARD FUNCTION

[75] Inventor: Tetsuya Kuwahara, Shiga, Japan

[73] Assignee: Murata Kikai Kabushiki Kaisha, Kyoto, Japan

[21] Appl. No.: 694,940

[22] Filed: May 2, 1991

[30] Foreign Application Priority Data

May 8, 1990 [JP] Japan .................................. 2-119346

[51] Int. Cl.5 ............................................... H04N 1/00
[52] U.S. Cl. .................... 358/440; 358/403; 358/434; 358/444; 358/402; 379/100
[58] Field of Search .................. 379/100, 97; 358/434, 358/435, 400, 402, 403, 440, 441

[56] References Cited

U.S. PATENT DOCUMENTS

| | | | |
|---|---|---|---|
| 4,811,386 | 3/1989 | Sano et al. | 379/100 |
| 4,939,767 | 7/1990 | Saito et al. | 379/100 |
| 4,994,926 | 2/1991 | Gordon et al. | 358/402 |
| 5,014,300 | 5/1991 | Harvath et al. | 379/100 |
| 5,091,932 | 2/1992 | Tsuda | 379/100 |

Primary Examiner—Edward L. Coles, Sr.
Assistant Examiner—Fan Lee
Attorney, Agent, or Firm—Spensley Horn Jubas & Lubitz

[57] ABSTRACT

Disclosed herein is a facsimile apparatus with a message-board function, which comprises a device for setting up a first supervisory period between the reception of a message and the execution of its associated procedure for thereby detecting whether or not a DTMF signal is inputted during the first supervisory period, a device for setting up a second supervisory period when a desired DTMF signal is detected during the first supervisory period for thereby detecting whether or not a DTMF signal is inputted during the second supervisory period, and a device for temporarily releasing the connection of a line when a group of DTMF signals indicative of a telephone number are detected during the second supervisory period for making calls by dialing with respect to the telephone office number, thereby transmitting the contents of a message to a called side.

8 Claims, 5 Drawing Sheets

FACSIMILE APPARATUS WITH MESSAGE-BOARD FUNCTION

FIELD OF THE INVENTION

The present invention relates to a facsimile apparatus with a message-board function wherein a memory incorporated in the facsimile apparatus is used as a message board. When a request for a message is made from another facsimile apparatus, a previously recorded message in the memory can be transmitted to the other facsimile apparatus in response to its request.

DESCRIPTION OF THE RELATED ART

There is generally known a telephone set with a message-board function. More specifically, a cassette tape, which is incorporated into the telephone set and records a message in the subscriber's absence or the like, is used as a message-board, and the contents of the message are recorded on the cassette tape. Thus, when a telephone call is made, a caller can be informed of the contents of the message.

When the contents of the message are made up only of voice information, a telephone set with a message-board function is of great use. On the other hand, when the contents of the message include information about a map or the like for which visual sensation is necessary, a facsimile apparatus is required.

Accordingly, in a manner similar to a telephone set, a facsimile apparatus may include a memory used as a message board, when a request for a message is made from another facsimile apparatus, a message previously stored in the memory is transmitted to the other facsimile apparatus in response to its request.

The request for the message-board function referred to above and its reception, however, must be done under the non-standard procedure which is out of the range defined by the advice of CCITT. Therefore, while these functions maybe performed between conventional facsimile apparatus made by the same manufacturer and provided with non-standard procedures common to each other, they cannot be performed between facsimile apparatus made by different makers because the non-standard procedures differ from each other, thereby undergoing communication rejection or the like taking maker codes as being different from each other so as to disable the execution of the request for the message-board function and its reception in may cases.

SUMMARY OF THE INVENTION

With the foregoing in view, it is a principal object of the present invention to provide a facsimile apparatus with a message-board function, which permits the utilization of a message-board function between the facsimile apparatus of the present invention and a facsimile apparatus made by other maker whose non-standard procedures differ from each other.

It is another object of the present invention to provide a facsimile apparatus with a message-board function, which comprises means for setting up a first supervisory period between the reception of a message and the execution of its associated procedure for thereby detecting whether or not a DTMF signal is inputted during said first supervisory period, means for setting up a second supervisory period when a desired DTMF signal is detected during said first supervisory period for thereby detecting whether or not a DTMF signal is inputted during said second supervisory period, and means for temporarily severing the connection of a line when a group of DTMF signals indicative of a telephone number are detected during said second supervisory period for making calls by dialing with respect to said telephone number, thereby transmitting the contents of a message to a called side.

It is a further object of the present invention to provide the apparatus further including means for receiving a message delivered from a calling side in a memory when the DTMF signal is undetected during said second supervisory period.

Thus, in accordance with a preferred embodiment of the present invention even a facsimile apparatus made by other maker and having a non-standard procedure different from that of the facsimile apparatus of the present invention can successfully request the message-board function from the facsimile apparatus of the present invention.

More specifically, in accordance with a preferred embodiment of the present invention, when a predetermined push button, e.g., a "#" button is depressed after a call is made by dialing from the calling side and a message is received, the facsimile apparatus of the present invention as the called side receives the DTMF signal and detects a request for the message-board function, which is made by the calling side. When the request for the message-board function is detected and the group of DTMF signals indicative of the telephone number are delivered from the calling side during a second supervisory period, it is judged that the calling side becomes the message request side. After the electrical connection of the line is temporarily released, the calls are made by dialing telephone number, so that the contents of the message, which have been previously recorded in the memory, maybe transmitted.

In accordance with the preferred embodiment, the detection of the request for the message-board function and that of the DTMF signal corresponding to the telephone number are performed before the execution of necessary. Thus, the problem of message-board function rejection caused by a difference in the non-standard procedure between two facsimile apparatus is eliminated.

According to another preferred embodiment when the DTMF signal is not detected during a second supervisory period, it is judged that the calling side becomes the message transmission side, so that the contents of its transmitted message maybe received in the memory.

According to the present invention, visual information about the map or the like can be transmitted as the contents of the message by providing the message-board function, thereby making more convenient use of the information. In this case, the message-board communication is also accepted from the facsimile apparatus of other manufacturer whose non-standard procedure differs from that of the facsimile apparatus of the present invention, thus removing inconvenience that the message-board function can be used only between the facsimile apparatus made by the same maker. In addition, facsimile apparatus in accordance with the present invention can exhibit advantageous effects in that the complexity of the structure manufacturing costs are not increased inordinately.

The above and other objects, features and advantages of the present invention will become apparent from the following description and the appended claims, taken in conjunction with the accompanying drawings in which a preferred embodiment of the present invention is shown by way of illustrative example.

BRIEF DESCRIPTION OF THE DRAWINGS

FIGS. 1 through 4 are diagrams each showing one embodiment of the present invention, in which:

FIG. 1 is a block diagram schematically showing a structure of a circuit for a facsimile apparatus;

FIG. 3 is a flowchart for describing the routine procedure executed in memory reception; and FIG. 4 is a flowchart for describing the routine procedure for printing out the contents in a memory.

DETAILED DESCRIPTION OF THE PREFERRED EMBODIMENTS

One embodiment of the present invention will hereinafter be described with reference to FIGS. 1 through 4.

Figure 1:
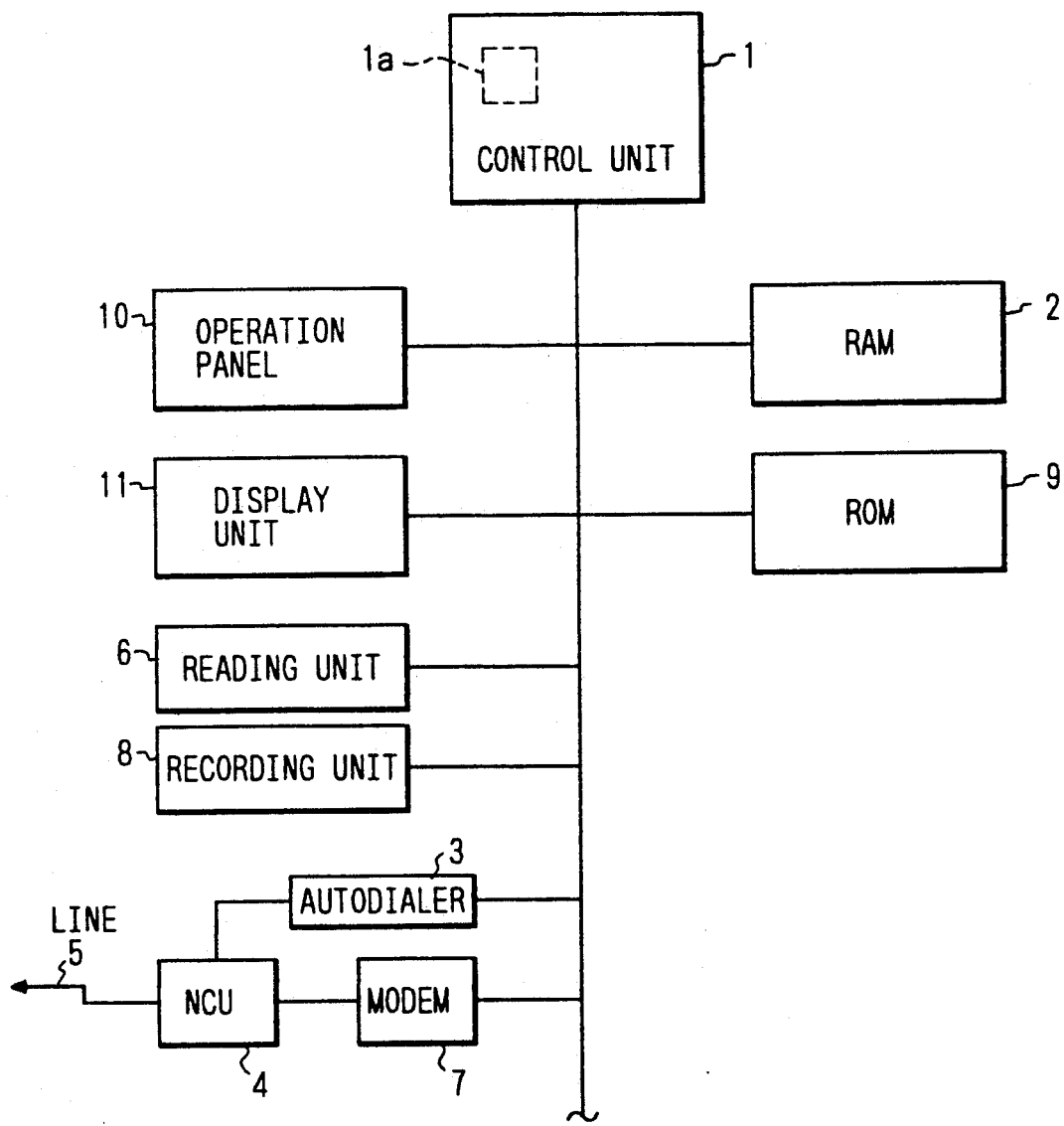

FIG. 1 is a block diagram schematically showing a structure of a circuit for a facsimile apparatus. In the same drawing, the facsimile apparatus comprises a control unit 1, a RAM 2, an autodialer 3, an NCU 4, a reading unit 6, a modem 7, a recording unit 8, a ROM 9, an operation panel 10, and a display unit 11.

The control unit 1 serves as a central unit so as to control an overall operation for the transmission and reception of the facsimile apparatus based on a control program stored in the ROM 9. A basic transmission operation of the facsimile apparatus is substantially carried out as follows.

When an unillustrated communication key or one-touch type dial key is depressed by an operator so as to be electrically ON, the control unit 1 reads a telephone number of a called side, which is stored in the RAM 2. Then, the thus-read telephone number is transmitted by dialing to a telephone line 5 through the autodialer 3 and the NCU 4. After the telephone number has been transmitted by dialing, image data of an original, which is read by the reading unit 6 or image data which has been recorded in advance in the RAM 2, is delivered to the telephone line 5 through the modem 7 and the NCU 4, so that the transmission operation of the facsimile apparatus is performed.

Figure 2A:
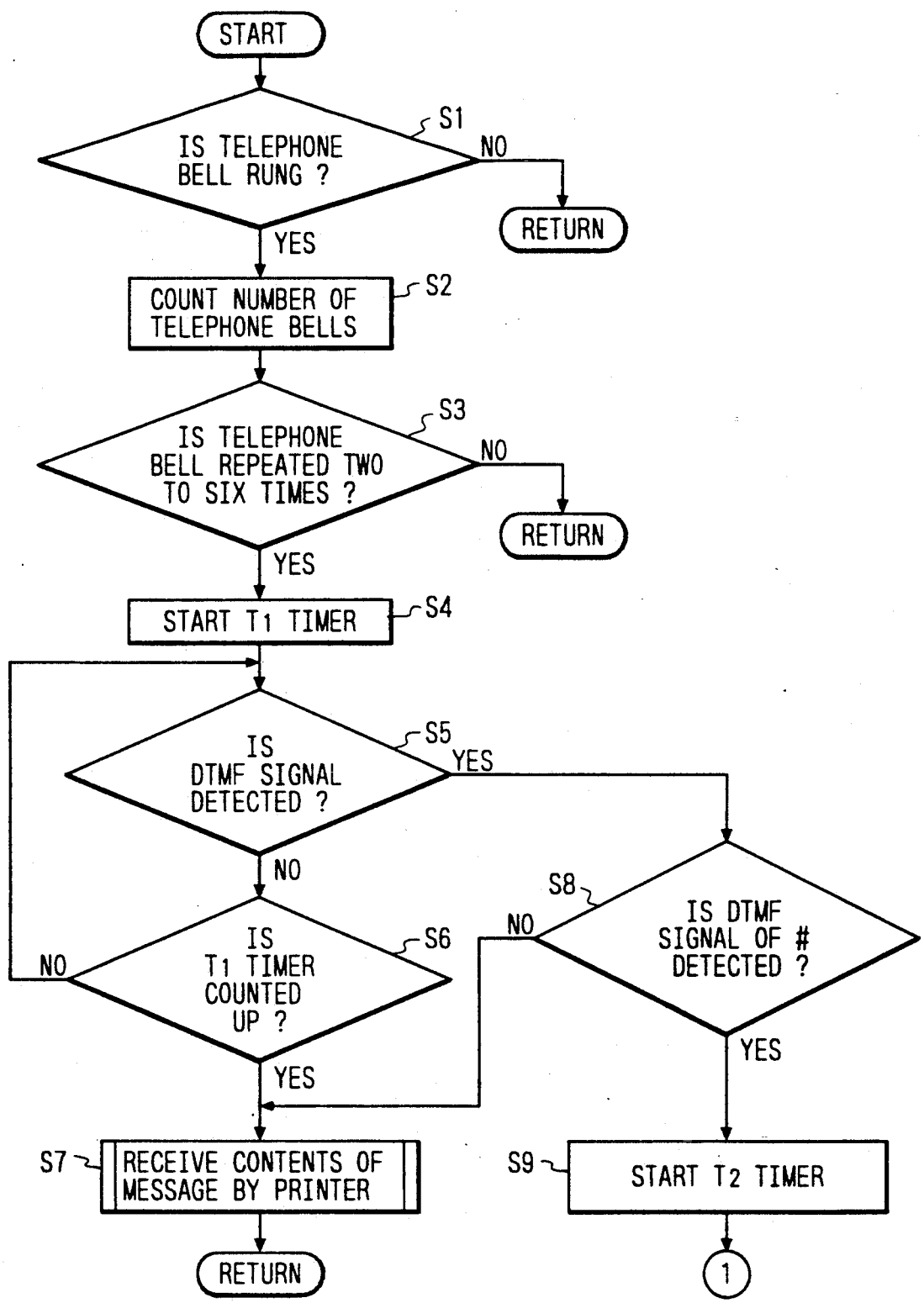
FIGS. 2a and 2b are flowcharts for describing receiving operations including a message-board reception process.
Figure 2B:
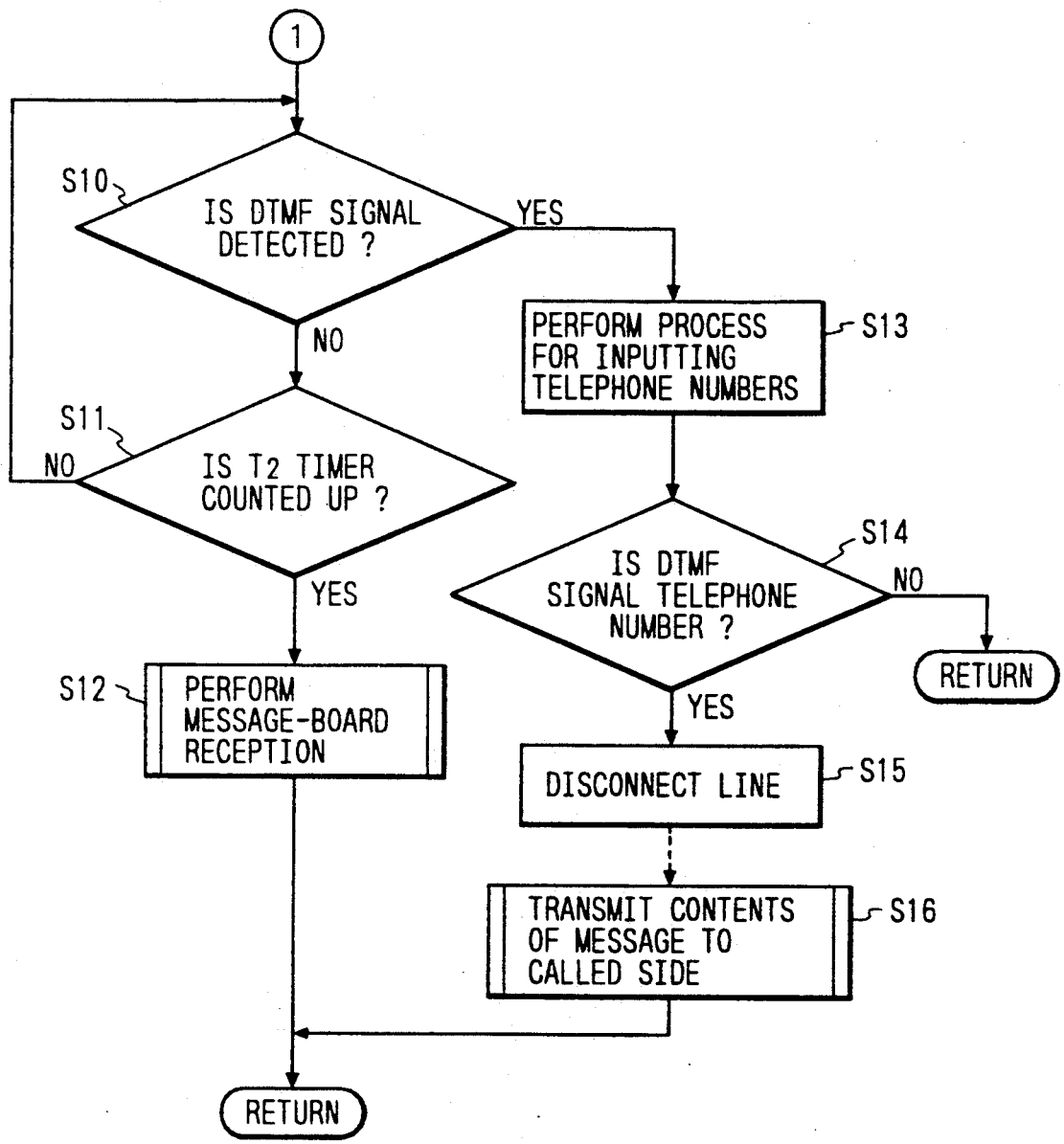

On the other hand, the reception operation of the facsimile apparatus is carried out as follows. FIGS. 2a and 2b are flowcharts for describing the routine procedure for processing receiving operations including a message board function.

It is first determined in Step S1 whether or not a telephone bell is rung. If it is determined to be positive, the number of the telephone bells is counted in Step S2. It is then determined in Step S3 whether or not the telephone bell is repeated two to six times. The number of the telephone bells repeated two to six times is shown as one example in the present embodiment, and the number of the telephone bells is not necessarily limited to the two to six times.

When the number of the telephone bells is less than two times, error processing is made and the routine procedure is returned. On the other hand, when the number of the telephone bells is repeated two to six times, a message is received. The setting of a first supervisory period corresponding to T1 (for example, 20 seconds) is initiated in Step S4. The setting of the supervisory period T1 is made by a timer 1a incorporated into the control unit 1. It is then determined in Step S5 whether or not a DTMF signal is transmitted from a calling side. When a message-board communication is required by the calling side, the DTMF signal is delivered to the called side by depressing a push button of the facsimile apparatus from the calling side. Incidentally, the DTMF signal can be detected by the modem 7. However, a DTMF signal detecting circuit may be provided separately to detect the DTMF signal.

When no DTMF signal is detected, it is determined in Step S6 whether or not the supervisory period T1 set in Step S4 is counted up. If it is determined to be negative, the routine procedure is returned to Step S5. That is, the detection of the DTMF signal is made continuous until the set supervisory period T1 elapses.

When no DTMF signal is detected and the supervisory period T1 has elapsed, it is judged that normal communication has been made. At this time, the procedure for transmitting a CED (called terminal identification signal) and a DIS (digital identification signal), for example is initiated. Thereafter, the contents of its transmission are recorded on a printing paper in the recording unit 8 in Step S7.

On the other hand, when the DTMF signal is detected during the supervisory period T1, it is determined in Step S8 whether or not the DTMF signal is one indicative of, for example, a "#". If it is judged to be negative, the routine procedure proceeds to Step S7 where a receiving operation by a printer is performed. On the other hand, if it is judged to be positive in Step S8, a second supervisory period T2 is initiated in Step S9. The setting of the second supervisory period T2 is carried out by the timer 1a incorporated into the control unit 1 in the same manner as the first supervisory period T1. Incidentally, in the present embodiment, when the DTMF signal indicative of "#" is detected, the message-board communication is made. However, a DTMF signal indicative of "*" may be set as a message-board communication request signal.

It is then determined in Step S10 whether or not the DTMF signal is transmitted from the calling side during the second supervisory period T2. If it is determined to be negative, then it is judged in Step S11 whether or not the second supervisory period T2 set in Step S9 is counted up. If it is judged to be negative in Step S11, the routine procedure is returned to Step S10. That is, the detection of the DTMF signal is continuously performed until the thus-set second supervisory period T2 elapses.

When the DTMF signal is not detected and the second supervisory period T2 has elapsed, it is judged that the calling side becomes the side of transmission of a message. At this time, the procedure for transmitting the CED and DIS, for example, is initiated. Thereafter, the contents of its transmission are received, i.e., recorded in a memory in Step S12. A detailed description of the memory reception will be made later.

On the other hand, when a DTMF signal corresponding to each of numbers of 0 to 9 is detected during the second supervisory period T2, a reception process for inputting telephone numbers is executed in Step S13. That is, the DTMF signals delivered from the calling side by successively depressing push buttons of numbers indicative of its own telephone numbers during the second supervisory period T2 are successively stored in the RAM 2, thereby holding the same as the telephone numbers on the calling side.

If it is judged in step S14 that a group of inputted DTMF signals surely do not represent desired telephone numbers, the error processing is executed and the routine procedure is returned. On the other hand, if it is determined to be the desired telephone numbers, it is judged that the calling side becomes a message-requiring side. After the line is temporarily turned off in Step S15, calls are made by dialing with respect to a desired telephone number, thereby transmitting the contents of a message stored in advance in the RAM 2 in Step S16. Incidentally, when the group of inputted DTMF signals coincide with the telephone number registered in advance, the routine procedure may be advanced to Step S15.

Figure 3:
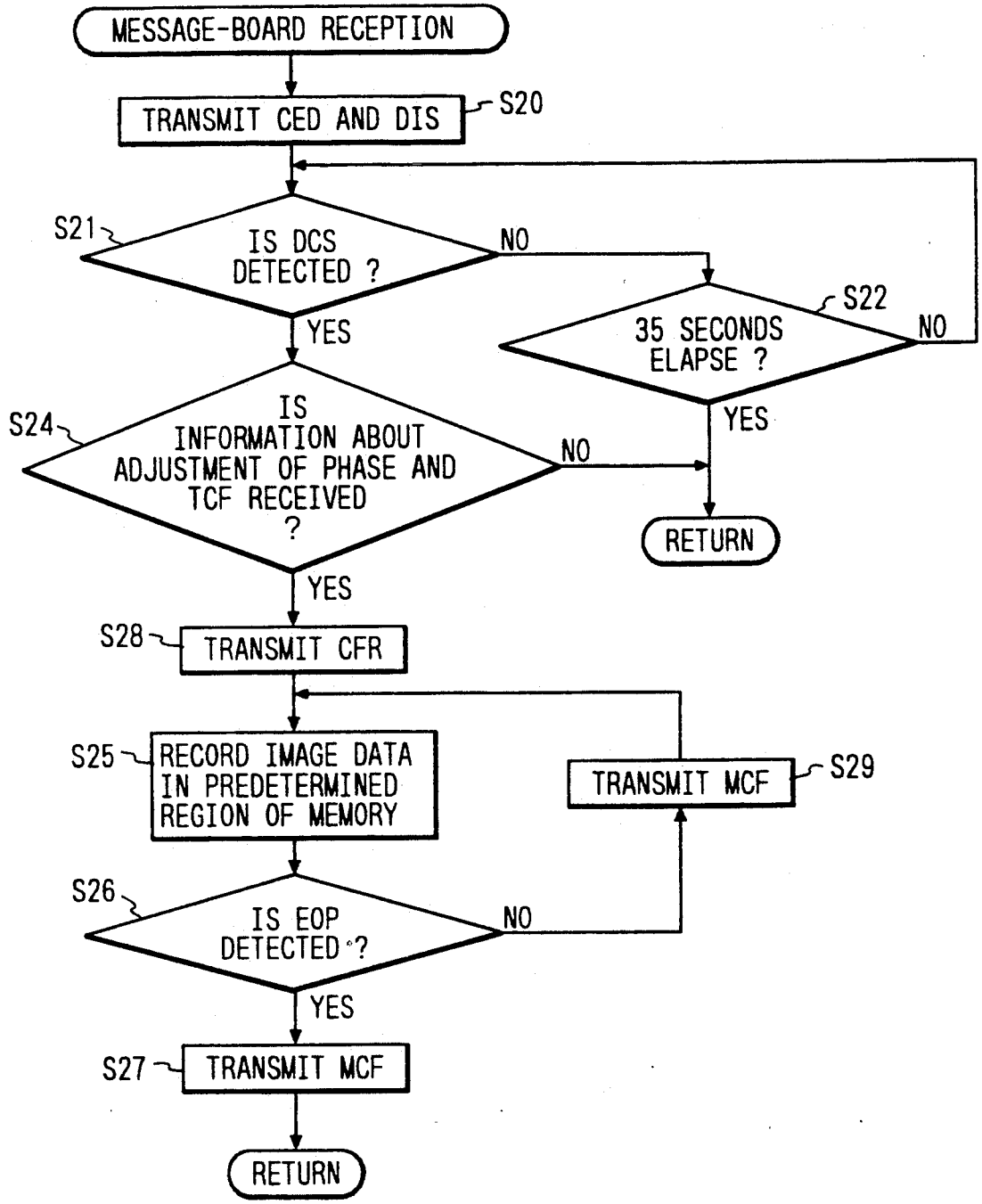

A description will now be made in detail of a process for the memory reception (message reception) with reference to a flowchart shown in FIG. 3. After the CED and the DIS are first transmitted in Step S20, it is determined in Step S21 whether or not a DCS (digital command signal) is transmitted from the calling side. If the DCS is detected, then the routine procedure proceeds to Step S24. If it is not detected on the other hand, then the processing for detecting the DCS (in Step S21) is repeated for 35 seconds in Step S22. Nevertheless, when it is not detected, the error processing is made and the routine procedure is then returned.

It is determined in Step S24 whether or not communication can be made at the transmission speed on the calling side after information about adjustment of the phase and about a TCF (training check) is received. If it is judged to be negative, the error processing is made and the routine procedure is then returned. On the other hand, if it is judged to be positive in Step S24, after CFR (confirm fit-for-reception signal) is transmitted (S28), the contents of a message (image data) are recorded in a message memory region of the RAM 2, which has been designated in advance in Step S25.

It is then determined in Step S26 whether or not an EOP (end-of-procedure signal) is transmitted or detected in the recording of the image data. If the EOP is detected, an MCF (message confirmation signal) is delivered to the calling side in Step S27, and thereafter the routine procedure is returned. On the other hand, if the EOP is not detected, the MCF is transmitted to the calling side as needed in Step S29, and thereafter the routine procedure is advanced to Step S25.

Incidentally, the facsimile apparatus on the calling side normally waits for the return of the CED and DIS for 30 seconds. Therefore, the second supervisory period can arbitrarily be set in a region where the sum of the time required to detect the DTMF signal during the first supervisory period T1 and the second supervisory period T2 is 25 seconds (obtained by subtracting 5 seconds from 30 seconds taking into consideration a delay of transmission) for example. That is, 20 seconds are secured as the supervisory period T1 for the present in the present embodiment. However, when the time required to detect the DTMF signal is 5 seconds, for example, 20 seconds can be ensured at the maximum as the second supervisory period T2.

Figure 4:
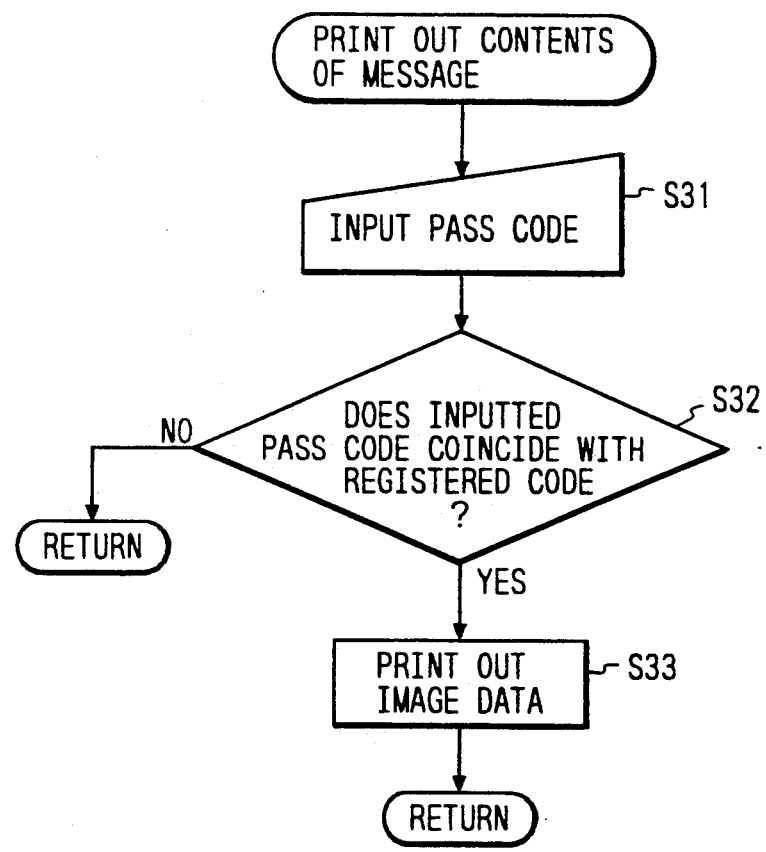

A description will now be made of the operation for printing out the contents of information received in the memory with reference to a flowchart shown in FIG. 4. In this case, the operator sets the facsimile apparatus to a message-content print mode by a mode changeover unit.

First of all, the operator inputs a pass code in Step S31. The pass code can be inputted by using a set of ten keys or the like, for example. In the facsimile apparatus, it is then determined in Step S32 whether or not the inputted pass code coincides with a preregistered code. If it is judged to be negative, the error processing is performed and the routine procedure is returned. Thus, other persons who do not know the pass code cannot understand the contents of the message communication as a matter of course. On the other hand, if it is judged to be positive in Step S32, the image data is read from the RAM 2, thereby recording the thus-read data on a printing paper in the recording unit 8 in Step S33.

According to the above-described arrangement, the detection of the request for the message function from the calling side and the detection of the DTMF signal corresponding to the telephone number are performed before the execution of the routine procedure. Therefore, there is no offered a problem that a message-function rejection caused by the difference of the non-standard procedure between facsimile apparatus is made.

When the DTMF signal is not detected during the second supervisory period T2, it is judged that the calling side becomes into the message transmission side, thereby making it possible to accept the message transmission.

Having now fully described the invention, it will be apparent to those skilled in the art that many changes and modifications can be made without departing from the spirit or scope of the invention as set forth herein.

What is claimed is:

1. A facsimile apparatus connectable to a remote apparatus, comprising:
    means for initiating a first supervisory period, and for detecting a DTMF signal received from the remote apparatus during the first supervisory period;
    means for initiating a second supervisory period in response to a detection of a predetermined DTMF signal during the first supervisory period, and for detecting a group of DTMF signals received from the remote apparatus during the second supervisory period; and
    means for terminating connection to the remote apparatus reception of a group of DTMF signals during the second supervisory period which correspond to a telephone number, for dialing the telephone number corresponding to the group of DTMF signals received during the second supervisory period, and for transmitting data to a party corresponding to the telephone number.

2. The facsimile apparatus of claim 1, further comprising:
    means for receiving data from a calling side when no DTMF signal is received during the first supervisory period.

3. The facsimile apparatus of claim 1, further comprising:
    means for receiving data from a calling side when a DTMF signal received during the first supervisory period does not correspond to the predetermined DTMF signal.

4. The facsimile apparatus of claim 1, further comprising:
    means for receiving data from a calling side and for storing the data in memory when no DTMF signal is received during the second supervisory period.

5. A method of operating a facsimile apparatus, comprising the steps of:
    establishing connection with a remote apparatus initiating a first supervisory period;
    detecting a DTMF signal received from the remote apparatus during the first supervisory period;

initiating a second supervisory period in response to a detection of a predetermined DTMF signal during the first supervisory period;

detecting a group of DTMF signals received from the remote apparatus during the second supervisory period;

terminating connection with the remote apparatus in response to a reception of a group of DTMF signals during the second supervisory period which correspond to a telephone number;

dialing the telephone number corresponding to the group of DTMF signals received during the second supervisory period; and transmitting data to a party corresponding to the telephone number.

6. The method claim 5, further comprising the step of:

receiving data from a calling side when no DTMF signal is received during the first supervisory period.

7. The method claim 5, further comprising the steps of:

receiving data from a calling side when a DTMF signal received during the first supervisory period does not correspond to the predetermined DTMF signal.

8. The method claim 5, further comprising the step of:

receiving and storing data from a calling side when no DTMF signal is received during the second supervisory period.

* * * * *